(No Model.)

L. COONEY, Jr.
CASH REGISTER.

No. 565,963. Patented Aug. 18, 1896.

Fig. 1

Witnesses:
M. J. Longyear
Walter B. Wood

Inventor,
Luke Cooney Jr.
By Fred L. Chappell
Att'y.

(No Model.) 9 Sheets—Sheet 2.

L. COONEY, Jr.
CASH REGISTER.

No. 565,963. Patented Aug. 18, 1896.

Fig. 2

Witnesses.
M. J. Longyear.
Walter S. Wood.

Inventor,
Luke Cooney Jr.
By Fred L. Chappell
Att'y.

(No Model.) 9 Sheets—Sheet 3.

L. COONEY, Jr.
CASH REGISTER.

No. 565,963. Patented Aug. 18, 1896.

Fig. 3.

Witnesses: Inventor,
Luke Cooney Jr.
By Fred L. Chappell
Att'y.

(No Model.)  L. COONEY, Jr.  9 Sheets—Sheet 4.
CASH REGISTER.

No. 565,963.  Patented Aug. 18, 1896.

Fig. 4

Witnesses:  Inventor,
  Luke Cooney Jr
  By Fred L. Chappell
  Atty.

(No Model.)  
9 Sheets—Sheet 5.

L. COONEY, Jr.
CASH REGISTER.

No. 565,963.  Patented Aug. 18, 1896.

Fig. 5

Witnesses:  
M. I. Longyear  
Walter S. Steed

Inventor,  
Luke Cooney Jr.  
By Fred L. Chappell  
Atty.

(No Model.)  9 Sheets—Sheet 6.

L. COONEY, Jr
CASH REGISTER.

No. 565,963. Patented Aug. 18, 1896.

Fig. 6

Witnesses:
M. J. Longyear
Walter S. Wood

Inventor,
Luke Cooney Jr
By Fred L. Chappell
Att'y.

(No Model.) 9 Sheets—Sheet 7.

L. COONEY, Jr.
CASH REGISTER.

No. 565,963. Patented Aug. 18, 1896.

Witnesses:
M. J. Lougeran
Walter S. Wood

Inventor,
Luke Cooney Jr.
By Fred L. Chappell
Att'y (No Model.) 9 Sheets—Sheet 8.

L. COONEY, Jr.
CASH REGISTER.

No. 565,963. Patented Aug. 18, 1896.

Witnesses:
M. J. Lougyear
Walter S. Wood

Inventor,
Luke Cooney Jr
By Fred L. Chappell
Att'y.

(No Model.) 9 Sheets—Sheet 9.

L. COONEY, Jr.
CASH REGISTER.

No. 565,963. Patented Aug. 18, 1896.

Witnesses:

Inventor,
Luke Cooney Jr.
By Fred L. Chappell
Att'y.

UNITED STATES PATENT OFFICE.

LUKE COONEY, JR., OF KALAMAZOO, MICHIGAN, ASSIGNOR OF ONE-FOURTH TO LAURENCE COONEY, OF SAME PLACE.

CASH-REGISTER.

SPECIFICATION forming part of Letters Patent No. 565,963, dated August 18, 1896.

Application filed October 11, 1894. Serial No. 525,581. (No model.)

*To all whom it may concern:*

Be it known that I, LUKE COONEY, Jr., a citizen of the United States, residing at the city of Kalamazoo, in the county of Kalamazoo and State of Michigan, have invented certain new and useful Improvements in Cash-Registers, of which the following is a specification.

My invention relates to cash-registers and particularly to improvements on a cash-register for which I made application for a patent, filed May 28, 1894, Serial No. 512,819, along with other additions thereto and changes which are entirely new, not being properly considered as mere improvements on the above-referred-to application.

The objects of my invention are, first, to cheapen and perfect the construction of cash-registers generally; second, to provide in a cash-register means for positive action of all of the parts from the operation of the keys so that the operation of the device shall not depend to any material extent upon the action of springs; third, to provide improved means of sustaining the indicator-slides; fourth, to provide an improved device for compelling the complete operation of a single key when started; fifth, to provide improved means of allowing the operation of but a single key at a time in each group; sixth, to provide improved mechanism for opening the drawer of the cash-register; seventh, to provide an improved drawer-lock for a cash-register; eighth, to provide improved means for actuating the registering mechanism of cash-registers; ninth, to provide an improved registering mechanism; tenth, to provide improved means of locking the register mechanism when the cash-register is opened; eleventh, to provide improved means of locking the keys of said register inside so that when the cover is locked down it will be impossible to operate any of the keys of the register, making the register substantially a safe; twelfth, to provide improved means of locking the register mechanism whenever the cover of the case of said register is open, so that it will be impossible for any one to tamper with or to operate the register mechanism except by operating the keys when the register-case is closed; thirteenth, to provide an improved stop for the register mechanism to prevent its striking by, when it is operated by a key, and thus prevent overregistering; fourteenth, to provide improved means in cash-registers whereby a key of each group may be operated at the same time and indicate the amounts above simultaneously, and, fifteenth, to provide improved keys for use upon cash-registers. I accomplish these objects by the mechanism shown in the accompanying drawings, in which—

All the sectional views are taken on the section-lines looking in the direction of the little arrows.

Similar letters of reference refer to similar parts throughout the several views.

Figure 2:
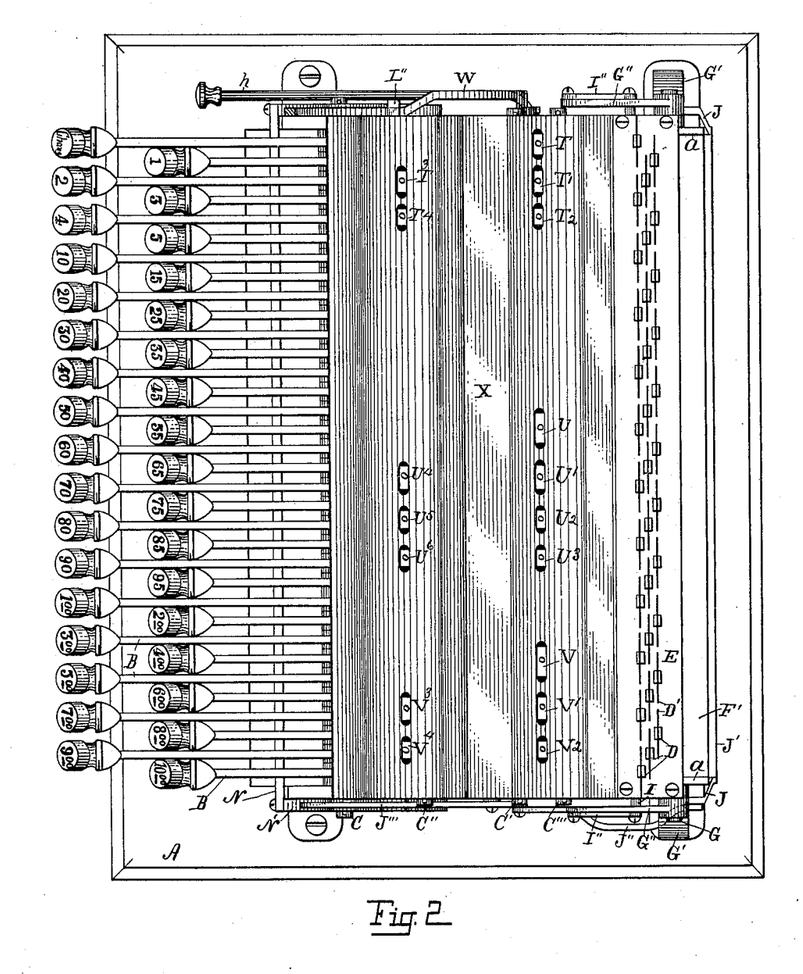
Fig. 2 is a top plan view of Fig. 1 with the upper portion of the case removed.
Figure 3:
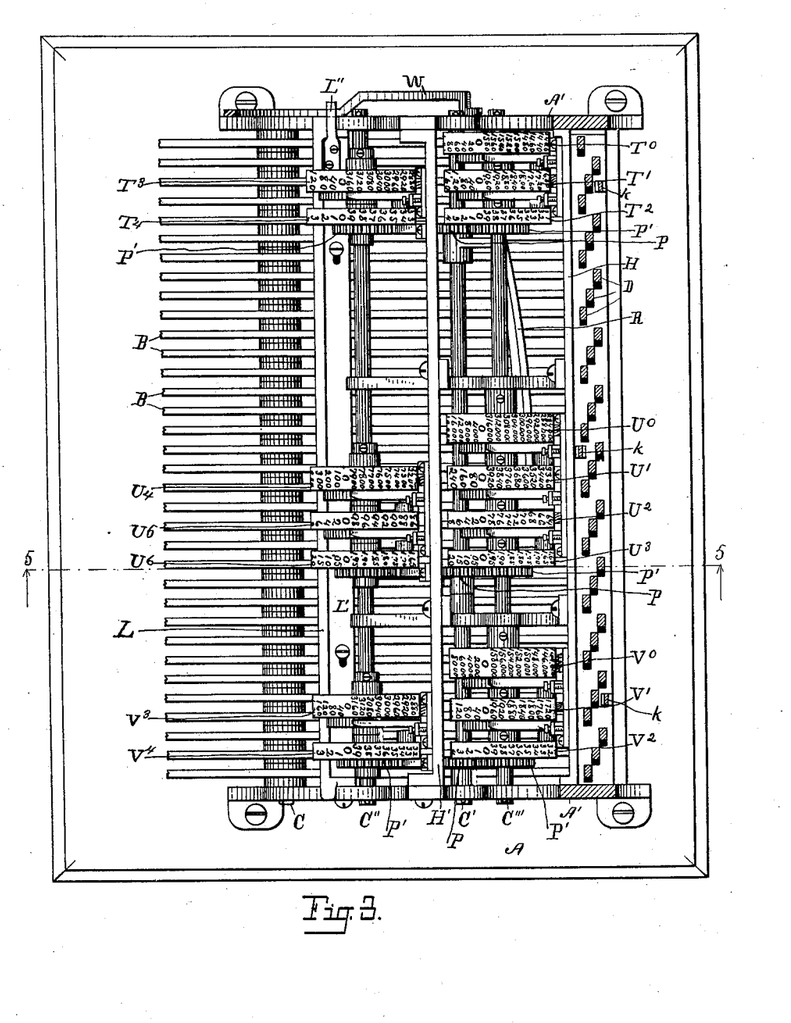
Fig. 3 is a top plan view partly in section on line 3 3 of Fig. 1, a portion of the keys being broken away and the upper portion of the keys being removed.

Referring to the lettered parts of the drawings, A represents the base portion of the case, within which is contained the drawer O'''. This drawer travels back and forth on the ball-bearings contained between the grooved pieces j j', the groove-piece j being upon the drawer, and the piece j' is fastened to the interior of the base of the case. On the base A rests a main frame A', which supports all of the upper parts of the machine. On the shaft C in said frame is pivoted keys B, which act as levers, the outer ends of which are formed to be conveniently depressed by the fingers. The rear end of the levers project under the indicator-slides D, each carrying a suitable tablet D' above, which indicates the amount to be registered by the key, and each of the keys is marked with a corresponding number. The outer ends of the keys are formed with a little outwardly-projecting disk, as shown in Fig. 2, on which the number appears with a flattened space above, so that the figures can be placed upon the key and depressed without concealing the number.

Across the framework A' under the forward end of the keys B a bar N extends, against which any key will act when it is depressed. This is connected by an arm N' to a weighted portion, which is pivoted on the same shaft C. Projecting up near the center of the machine in the front, coming under this bar N, is a bar O, which engages under this bar N and is pivotally connected to the lever O'. The lever O' is pivoted to a suitable lug attached to the upper part of the base A, and projects down and back, and when the keys are in the normal position an antifriction-roller engages the inside of the rear end of the drawer O'''. So it will be seen that as soon as a key is depressed it will push down the bar N, which will crowd down the rod O and raise the lever O' and release the drawer.

Figure 4:
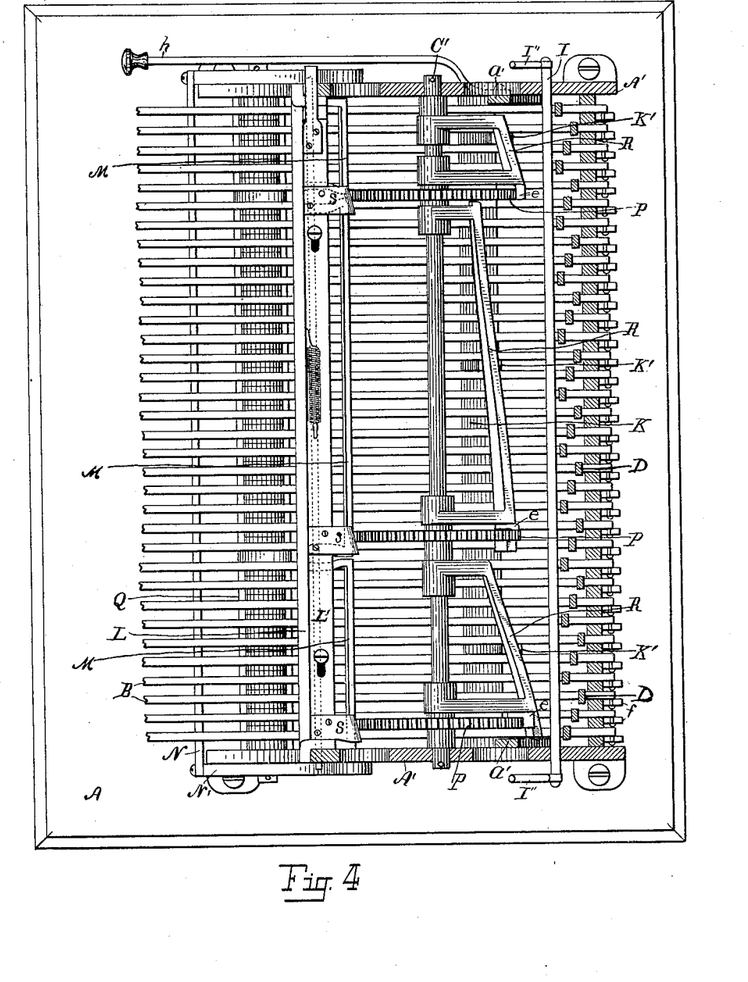
Fig. 4 is a top plan view partly in section on line 4 4 of Fig. 1, the keys being broken away.
Figure 5:
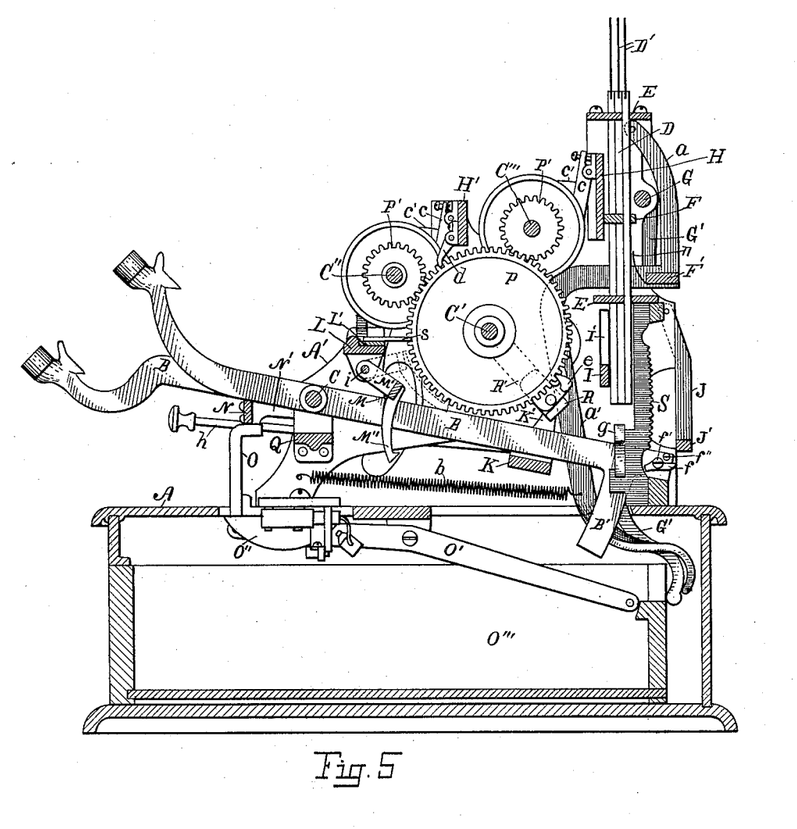
Fig. 5 is a sectional view on line 5 5 of Fig. 3, looking in the direction of the little arrows.

On the shaft G, well up on the frame A', and in this instance to the rear of the indicator-slides D, a crooked lever or bell-crank is pivoted, the arm of the same G' coming down from the shaft G and projecting down back of the drawer, resting against the drawer when the drawer is closed. There is a lever G' to each side of the machine, and the shaft G is a rock-shaft, uniting the two together, and rocks in suitable bearings in the framework A'. Across the framework and just to the front of the indicator-slides B a bar I projects, and is guided in place by the slots I' to each side of the case. (See Figs. 1, 4, and 5.) The bar I is located at a point so as to come in contact with the keys when their stroke is about one-half (½) completed, and is connected by links I" to the rear end of the short arms G'" of the bell-cranks or levers above referred to. When a key is depressed, it will be seen from this that it first depresses the front end of the lever O' by coming in contact with the bar N, which raises the rear end of it up to the dotted position indicated in Fig. 1, which frees the drawer, so that it can be easily moved out. When the key is still further depressed, it comes in contact with the bar I and carries the same up, acting through the link I" on the short lever G'", which actuates, through the long arms G', the drawer to throw it open. The drawer, traveling on the ball-bearings, moves very easily, and is opened by scarcely perceptible additional force upon the key being depressed. This explains how the drawer is opened in my improved cash-register by depressing a key. When the drawer passes out, it rings the bell O" by any suitable mechanism, that shown here being the same as described in my previous application above referred to, and therefore requires no additional explanation here.

Above the rear end of each key B is an indicator-slide D, bearing an indicator-tablet D' at the top. The rear end of the keys B pass up between racks S S, which guide them to position, and on the rear end of each key, pivoted at f', is a pawl f, which is reversible, a small space being left at the top and bottom of the rack S for the pawl to reverse in. A stop f'", consisting of a little screw, prevents the pawl from throwing too far in either direction and makes the same operative with the rack S at all times. To the front of the rack S are supported small triangular-shaped bodies g, the lower ends of which rest in little cavities at r, the upper ends of which are slotted, as at t', which swing back and forth on little screws t, which hold them in position. The breadth of all of these triangular bodies at the top is equal to the width of the section which they occupy less the thickness of one key. This will allow a single key to pass at a time, and as the pawl f compels the keys to pass clear to the top or clear to the bottom of the rack S it will be seen that the device accomplishes the result of compelling a complete stroke of the key whenever one of a group is started, the downwardly-projecting portion of the key B' following after the key and holding the stop g up until it has reached the end of its stroke. These stops coact with the racks S and pawl f, and, as will be seen, make it necessary for any one beginning the operation of the key to complete the stroke and thus prevent fraudulent tampering of the keys of any particular group.

Figure 6:
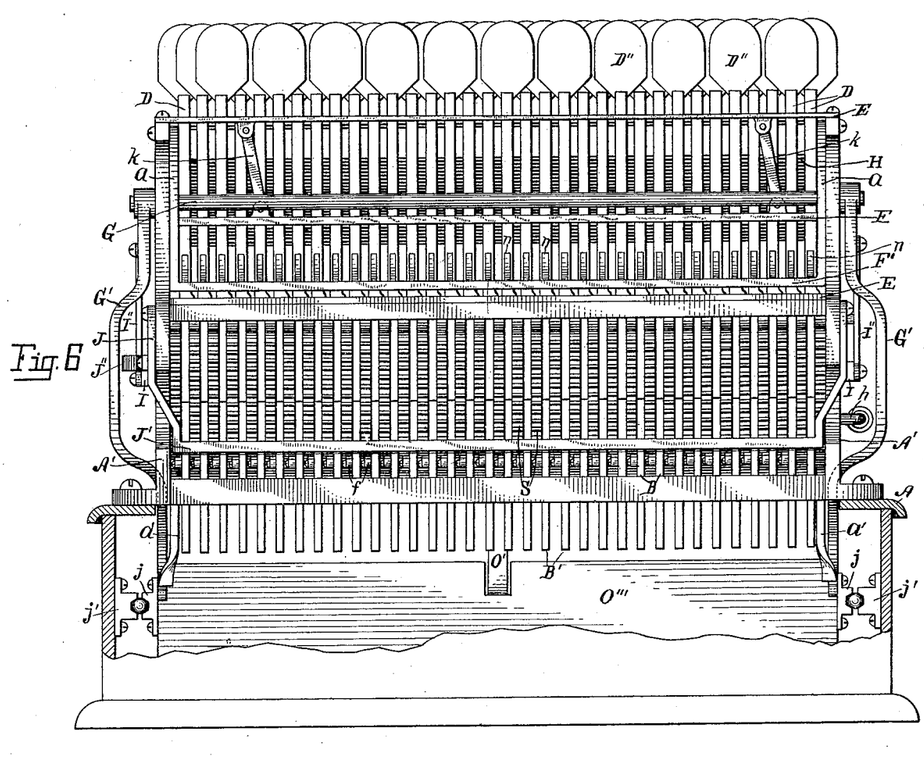
Fig. 6 is a rear elevation of the entire machine, the upper casing being removed and a portion of the base of the case being broken away.
Figure 7:
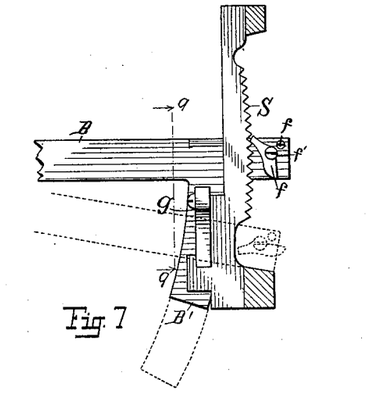
Fig. 7 is an enlarged detail view of the rear end of one of the keys and the pawl while the key is moving on the downward stroke.
Figure 8:
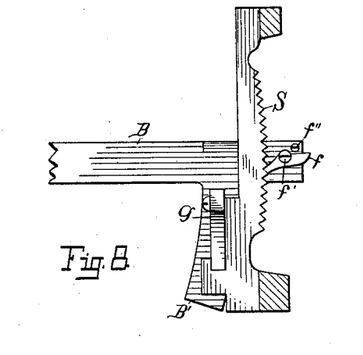
Fig. 8 is a view of the same where the key is moving on the upstroke.
Figure 9:
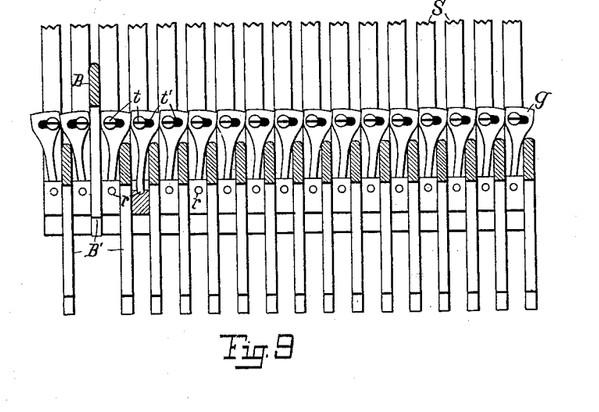
Fig. 9 is an enlarged detail view taken on line 9 9 of Fig. 7.

The tablet-rods D, with their tablets D', are each supported independently. Each stroke up of an indicator-slide releases the remaining slides and allows them to fall, so that only one slide remains to indicate the amount of the key depressed. This is accomplished by means of the plate F, extending across the upper rear portion of said machine and containing apertures for the passage of the indicator-slide. This plate F is supported by links k, connected to the upper plate E, which operates to hold the plate T, appearing something like parallel-rulers, the links projecting down at an angle to the right, as seen in Fig. 6, so that the weight will always tend to carry the plate F toward the left, as shown in Figs. 6 and 10.

Figure 10:
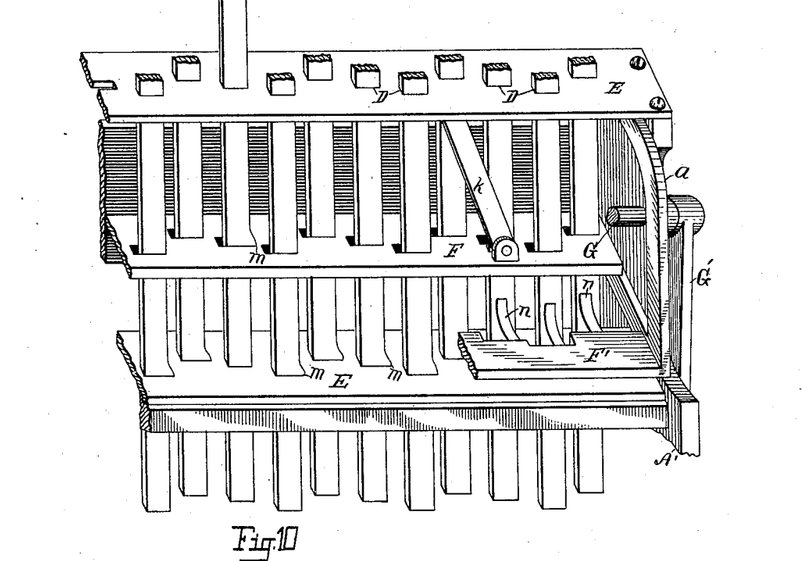
Fig. 10 is an enlarged detail perspective of the upper right-hand corner portion of the view shown in Fig. 6.
Figure 11:
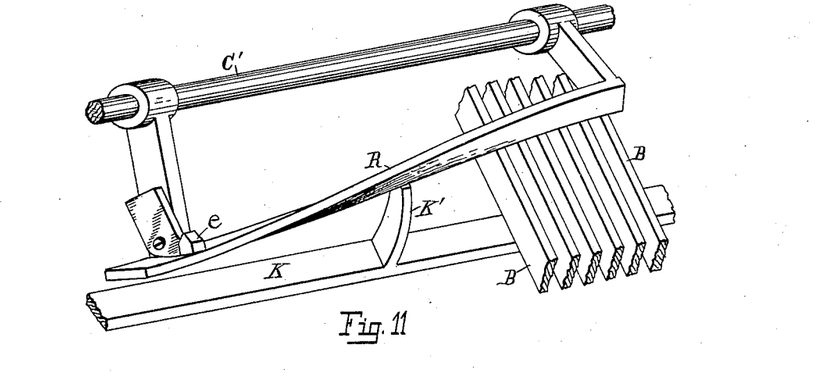
Fig. 11 is an enlarged detail view in perspective showing the curved bar R where the keys strike to operate the register mechanism.

By referring to Fig. 10 it will be noticed that on the right-hand side of each of the indicator-slides a projecting lug m appears, which is square on its under side. When an indicator-slide D is up, the plate F will drop under the lug m and retain it in position. When another slide D is moved up, this sloping lug m will pass up through the slot and carry the plate F to one side, which will release all of the remaining indicator-slides in passing up and will be retained itself by the plate F dropping under its lug m, holding it in place, thus indicating the amount of the key which had been depressed. It will be noted that this device for accomplishing its purpose is very compact, taking very little room, and is very positive and certain in its action. At times it is desirable, however, to strike up more than one indicator-slide at a time, as when the purchase amounts to some sum in dollars and cents, so that both dollars and cents will need to be registered. When this occurs, if only one indicator-slide will operate at a time, it will be necessary to operate all of the keys successively, which is not desirable, and therefore I have made a provision whereby more than one of the indicator-slides can be supported at a time during a single transaction when operated successively. A plate F' extends across the rear of the indicator-slides, and on this plate are supported small springs n n, which project out so that they will come in contact with each indicator-slide at the back. The plate F' is pivoted to the ends of the frame by upwardly-extending arms a, so that it will swing out or in, as desired, and from this plate F' extends a downwardly-extending arm a', which curves around into the machine and extends down and back of the drawer O''', so that when the drawer is closed the plate F' is braced back, so that the springs n do not come in contact with the indicator-slides D. A rod h, with a notch on its under side, (see Figs. 1, 2, 4, and 5,) connects with one of the arms a' and projects out through the front of the upper casing, (indicated by dotted lines,) terminating in a little knob just outside of the keys.

In operation, when one of the keys is depressed so that it allows the drawer to open, the springs B, connected to the arms a', will carry the same forward as soon as the rod h is raised up by its arm to allow the same to pass out to the front of the machine, when as many keys can be depressed as desired, owing to the fact that the springs n n come in contact with the indicator-slides D and support them by the friction against them. When the drawer is again closed, it engages the lower end of the arm a', carries it back, which pulls the springs n away from the rear indicator-slides and allows them to drop down upon the plate F, when the next key that is operated will release them all and allow them to drop down, thus making the indicator convenient for a person using but a single hand to depress three of the keys, one of each group, or any number sucessively, for that matter, and have them register a single transaction.

Figure 1:
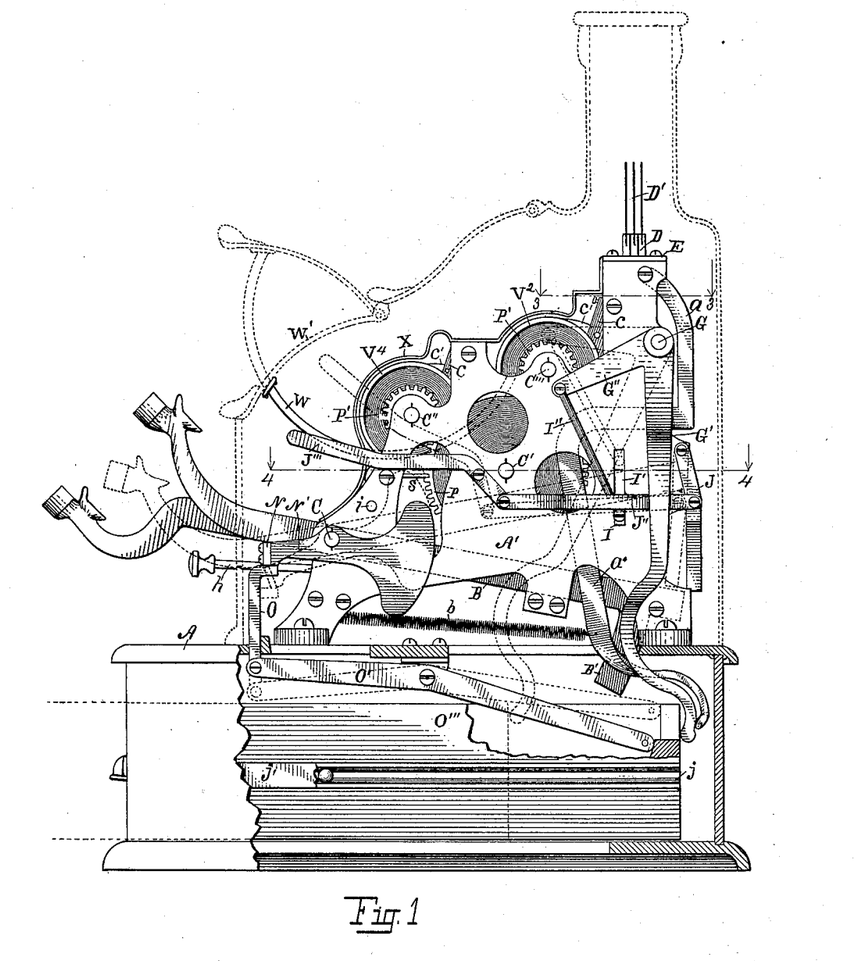
Figure 1 is an end elevation with part of the base of the case broken away and the remainder of the case shown in dotted lines, with dotted lines also indicating the operation and position of many of the parts.

As will be seen in Figs. 1 and 2, over the register mechanism of my improved cash-register a thin metal plate X is placed, and this is soldered in position securely and is nickel-plated and has apertures, which will be seen in Fig. 2, where the numbers of the various register-wheels appear to register their amounts. A curved rod W, with a cam, passes in to lock the gear, so that it will only be possible to disturb the registering mechanism situated on the shaft C''', which registers the total sums of all that may be registered upon the machine, by destroying the metal plate X or breaking it away, or by unsoldering the same. This makes it practically impossible for any one to tamper with the upper or total registering mechanism, which is very desirable where two or more partners are interested in the business, as, if it were possible to tamper with the total-register mechanism, there might be a temptation on the part of some of the partners to change the register mechanism to their advantage, and this is the reason for providing this means of preventing any such tampering with the same, so that each partner in the business shall know that if the machine is operated the amounts are registered and must be absolute.

Pivoted to the rear of the machine is a bar J', supported by upwardly-extending arms J. The bar J' passes just above the rear end of the keys B. To the upwardly-extending arms J is pivoted a link J'', which connects with the lever J''', which is pivoted to the side of the frame A. By moving this lever up it will be noted that the bar J' will be swung over the rear end of the keys B, and will lock them in position, so that it cannot be operated, and then, when the cover of the keys is on and locked, no one can get into the money-drawer, and the same serves as a safe.

On the shafts C', C'', and C''', extending through the case A', is supported the register mechanism of my improved machine. The register-wheels on each shaft, C'''' or C'', are divided into three groups, the first group indicating the aggregate of all small sums taken in, from one cent to five cents, the second and higher group indicating the aggregate sums taken in, varying from five cents to one dollar, and the higher group indicating the aggregate sums taken in from one dollar up. This enables the merchant, on a mere inspection of his cash-register, to know whether the small sales in the aggregate or the large sales are the ones from which he is deriving his profit. The lower group of wheels on the shaft C'' indicate the daily sales in each department. The upper groups indicate the aggregate sales for any long period which may be predetermined upon. On the shaft C', supported on suitable sleeves, are curved bars R, which I call "graduating-bars." Suitable stops K, supported on transverse bar K', support the graduating-bars R in the proper position for work. These bars are curved in relation to the axis of the shaft, so that different keys moving up strike against them and swing them proportionate distances around the shaft C' and act through little ratchets $e$ on the gear-wheels P. These gear-wheels P mesh with the gear-wheels P' P' on each of the shafts C'' C''' and actuate the numbered wheels of the registering mechanism.

Figure 12:
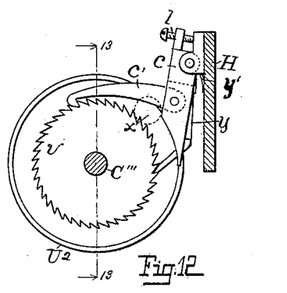
Fig. 12 is an enlarged detail view on line 12 12 of Fig. 13, showing one of the register-wheels of the upper register mechanism situated on the shaft C'''.
Figure 13:
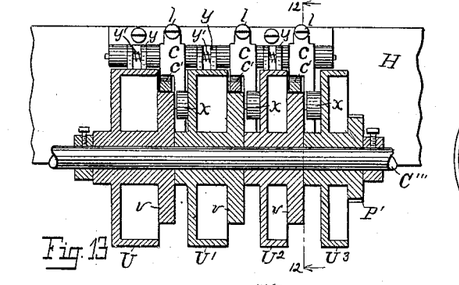
Fig. 13 is a sectional view on line 13 13 of Fig. 12, showing a portion of the register mechanism.
Figure 14:
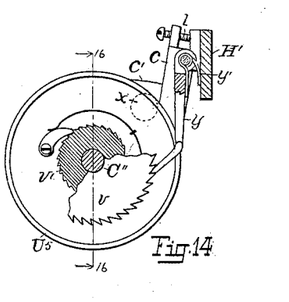
Fig. 14 is a view on line 14 14 of Fig. 16 of that portion of the register mechanism situated on the shaft C''.
Figure 15:
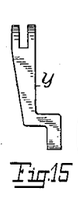
Fig. 15 is a detail view of the pawl $y$.
Figure 16:
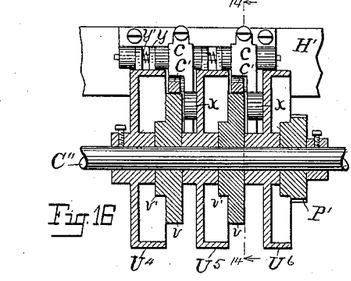
Fig. 16 is an enlarged detail sectional view on line 16 16 of Fig. 14.

On the shaft C'', as I said before, are situated wheels that indicate the daily sums, and on the shaft C''' are situated wheels that indicate the aggregate sums for a given period. The wheels on the shaft C'' are connected to the gears P', and on said shaft are little ratchets which admit of their independent operation on the shaft C''. (See Figs. 14 and 16.) A ratchet-pawl $y$ (see Figs. 19 and 15) is pivoted to the bar H', which extends across the frame and prevents a rearward rotation of said ratchet-wheel, so that in setting the same they are moved independently around until they come to zero and are used from that point forward when registering each day's sales, the wheels $T^3$ and $T^4$ registering the sales in the penny department, the wheels $U^4$, $U^5$, and $U^6$ registering the sales in the department from five cents to one dollar, and the wheels $V^3$ and $V^4$ registering the sales from one dollar up for each day. The wheels P of the register mechanism mesh with the wheels P' on the shaft C''' and actuate the total-registering mechanism. The movement, when the register mechanism is transferred from one wheel to the others of the next higher group, is in substantially the same manner as that shown in my application above referred to, with only slight variation. On one side of the gear-wheels U', $U^2$, and $U^3$ are situated antifriction-rollers $x$, which in revolving come in contact with the lever $c$, which will actuate the pawl $c'$ and move the next higher wheel B' to U and $U^2$ to $U^3$, &c., along one space, thus transferring the amount from the wheel U' $U^2$ to $U^3$, &c., to the next higher wheel of the series. A pawl $y$ engages the ratchet $v$ of each of these wheels and prevents any overregistering. A small spring $y'$ holds the pawl $y$ in position, and a screw $l$ permits the adjustment of the motion of the lever, so that it will not move the wheel forward two spaces. (See Figs. 12 and 16.) Each wheel thus acts independent of the other and transfers its amount to the higher wheels, as indicated in my former application, transferring the amounts, and in this device I have shown how the amounts may aggregate in three separate groups, so that that the merchant can determine which particular department is paying him the best, as I said before. Thus, where the items are small or where the items are larger, or where they are between five cents and one dollar, the numbers are placed on the peripheries of the wheels U' and $U^2$ of the upper register mechanism on the shaft C''', and on the wheels $U^4$, $U^5$, and $U^6$ on the shaft C'', (see Fig. 16,) and the amounts are transferred along much the same as shown in Fig. 14, where the construction appears on each of the wheels $U^4$, $U^5$, and $U^6$. On each is a small ratchet-wheel $v'$, which permits of the rotation of the wheels $U^4$, $U^5$, and $U^6$ independent of the actuating mechanism which permits these wheels to be set, as I said before, by moving them on around to "0."

Figure 17:
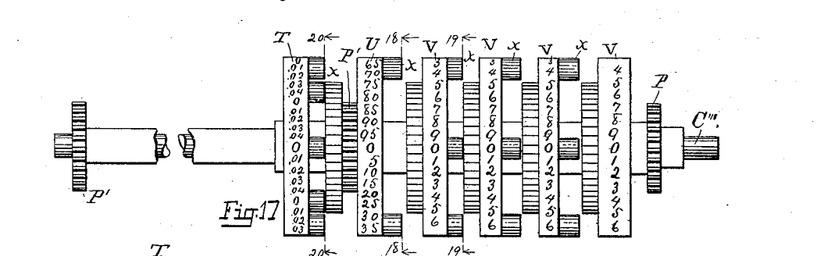
Fig. 17 shows a modification the device wherein the numbers on the peripheries of the register-wheels are so arranged that they pass up from the one-cent group to the five-cent group, from the five-cent group to the one-dollar group, from the one-dollar group to the ten-dollar group, from the ten-dollar to the one-hundred-dollar group, from the one-hundred-dollar group to the one-thousand-dollar group, and so on in the scale of ten after the dollar group is reached.
Figure 18:
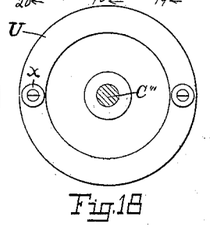
Fig. 18 is a detail view of the wheels U, taken on line 18 18 of Fig. 17.
Figure 19:
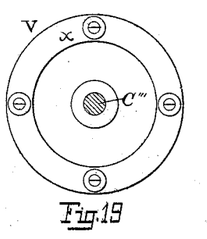
Fig. 19 is a detail view of the wheel V, taken on line 19, 19 of Fig. 17.
Figure 20:
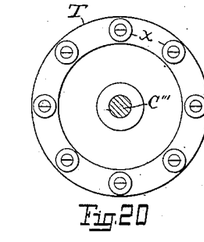
Fig. 20 is an enlarged detail view of the wheel T, taken on line 20 20 of Fig. 17.

In Fig. 17 I show a very convenient construction for the purposes of the total-adder, and in Figs. 18, 19, and 20 I show the construction of the number-wheels and how they accomplish their result. The wheel in Fig. 20 is the wheel on which is recorded the items from one cent to four cents, inclusive, and to save the necessity of swinging the wheel entirely around these items are put close together, and in the drawings eight of the antifriction-rollers $x$ are placed upon this wheel, so that the wheel in once revolving will have registered from one cent to four cents and zero eight times in going around, but it will give eight separate impulses to the next wheel U above it, which represents the groups of five cents to ninety-five cents on that wheel. The sums will appear twice from five cents to ninety-five cents and zero and will be recorded twice during the revolution of the wheel U, and two antifriction rollers $x\,x$ are required to actuate the next higher wheel. The next higher wheels represent the dollars, and two impulses which are received from the full rotation of the wheel U will register thereon two dollars. On the periphery of the wheel V are registered one dollar to nine dollars and zero and as the space on the wheel is sufficient for it to record the total four times four antifriction-rollers $x$ are needed, as will be seen in Fig. 19, and the remaining wheels of the series on the scale of ten are the same and run on indefinitely to as large a sum as may be required. The convenience of this is that the wheels, going on the scale of ten after the dollar-point is reached, may be read from right to left, as an ordinary number. Thus, if all the nines appear, it will begin at the right-hand or fourth wheel, which is the dollar group, or "$9000.00," then the third, or "$900.00," and the second, or "$90.00," and the first, or "$9.00," making it read from the right to left "$9999.00," or whichever figure appears in each particular place.

The register-wheels on the shaft C''' are not provided with any means for returning them to the zero-point, and there is provision whereby it is impossible for any one to move them when the upper case of the machine is opened to the position indicated by dotted lines in Fig. 1. A bar W is connected with the cover and swings around in a curve. This is cam-like in its operation and passes through a slot in the end of the transverse bar L'. This transverse bar is guided securely in place, and on the same are carried angular knives s, and when the case is open the bar W by its cam-like action carries the bars L' L'' sidewise and moves the sloping knife-edge into the gear between the teeth on the wheels P P and locks the same securely, and these, meshing with the wheels on the upper shaft C''', prevent any movement of them when the case is open, making it only possible to return the register to its position to begin the registration of another day's business.

A pin or rod i extends through the frame A above the keys near its shaft C. A bar M extends across the tops of each section of the keys and is pivoted to the arms projecting up on the rod i. Projecting down from this bar M is an arm M', with a rigid catch at the end adapted to engage between the teeth in the gear-wheel P. These arms M' travel at about the same rate as the graduating-bars R, so that they engage between the teeth of the gear-wheels P at the end of the stroke of the key and do not strike upon the tops of the same. This stop mechanism operates perfectly in accomplishing its result.

I desire to say that the details of my improved cash-register can be considerably varied without departing from my invention.

Having thus described my invention, what I claim as new, and desire to secure by Letters Patent, is—

1. In a cash-register, the combination of the base, A; the drawer, O''', therein; ball-bearings contained in the grooved strips, j, and j', attached to said drawer and base respectively; the main frame, A', above; the keys, B, in groups or sections, pivoted to the shaft, C; the bar, N, extending under all of said keys and pivoted by the arms, N', to the shaft, C; upwardly-extending bar, O; the lever, O', pivoted to said upwardly-extending bar, O, at its forward end and to a lug on the under part of the top of the base, A, and in its normal position, the rear end engaging the inside of the drawer, O'''; the rock-shaft, G, bearing a bell-crank, with arms, G', G'', the longer arm, G', of said bell-crank projecting down from said rock-shaft and engaging the drawer, O''', at the back side; a bar, I, extending across said main frame, A'; links, I'', connecting the ends of the short arms, G'', of the bell-cranks to coact with the keys to open the said drawer, the starting of the keys releasing the drawer by depressing the front end of the lever, O'; the transverse bar, J, supported by the arms, J', and adapted to swing over the rear ends of said keys, B; the indicator-tablets, D', supported above rods, D; the transverse plate, F, with holes mortised therethrough for each of the tablet-rods, D; links, k, to suspend said plate, F; and lugs, m, on said tablet-rods, D, for swinging said plate, F, to one side so that rasing one tablet will release the others that may be suspended by swinging the plate, F, to one side and will be itself retained by said plate, F; the plate, F', bearing springs, n, n, adapted to press against the tablet-rods, D, and support them in place by friction; upwardly-extending arms, a, rigidly attached to said plate, F', and pivoted to the upper rear portion of the case; downwardly-extending curved arms, a', a', passing down to the rear of the drawer, O'''; a rod, h, with a catch to engage in the upper outer casing and pivoted to said arms, a', to hold them back; a spring, b, which tends to draw said arms, a', forward; racks, S, S, to the rear of said machine between which said keys, B, are guided; reversible pawls, f, pivoted at f', to the rear end of said keys and a stop, f'', to prevent said pawls from swinging out of engagement with the racks, S; triangular-shaped bodies, q, containing slots, t', at their upper or broad end and the narrow end, r, resting in little depressions and screws, t, through the upper transverse slot, t', to hold said bodies in position the entire width of the bodies in each section being equal to the width of the section less the thickness of one key; downward-depending guide portions, B', on said keys, B, to pass between said triangular bodies, q; a curved graduating-bar, R, for each section of keys revolving on a shaft, C'; a suitable pawl thereon to engage the ratchet-wheels, P, to actuate the same in proportion to the amounts indicated on the key depressed; suitable connections from said wheels, P, to the numbered register-wheels; transverse bar, L'; angular knives, s, s, on said bar, L'; the bar, W, with a cam thereon to engage the outer end of said transverse bar, L', to actuate the same when the cover is raised to move the knives, s, into mesh with the wheels, P, P, P, to lock the register mechanism; a transverse pin or rod, $i$, the bar, M, pivoted by arms, M', to rod, $i$, and extending across each section of keys, B, bearing an arm with a stop, M'', to be actuated by the motion of the keys to engage the register-wheel, P, at the end of the stroke of the key, all coacting together substantially as described for the purpose specified.

2. In a cash-register, the combination of the base, A; the drawer, O''', therein; ball-bearings contained in the grooved strips, $j, j'$, attached to said base and drawer respectively; the main frame above; keys, B, in groups or sections pivoted on the shaft, C; a bar, N, extending under all of said keys and pivoted by the arms, N', to the shaft, C; upwardly-extending bar, O; a lever, O', pivoted to said upwardly-extending bar, O, at its forward end and to a lug on the under part of the top of the base, A, and in its normal position, the rear end engaging the inside of the drawer O'''; a rock-shaft, G, bearing a bell-crank with arms, G', G'', the longer arm, G', of said bell-crank projecting down from said rock-shaft and engaging the drawer, O''', at the back, a bar, I, extending across said main frame, A'; links, I'', connecting said bar I to the ends of the short arms, G'', of the bell-cranks to coact with the keys to open said drawer, the starting of the keys releasing the drawer by depressing the front end of the lever, O'; indicator-tablets, D', supported on rods, D, to be actuated by the keys above referred to; a transverse plate, F, with holes mortised therethrough for each of the tablet-rods, D; links, $k$, to suspend said plate, F, and lugs, $m$, on said tablet-rods for swinging said plate, F, to one side so that raising one tablet will release the others that may be suspended and will be itself retained by said plate, F; racks, S, S, to the rear of said machine between which said keys, D, are guided; reversible pawls, $f$, pivoted at $f'$, to the rear end of said keys; a stop, $f''$, to prevent said pawls from swinging out of engagement with the racks, S; triangular-shaped bodies, $g$, containing slots, $t'$, in the upper or broad end and the narrow end, $r$, resting in little depressions; screws, $t$, through the upper transverse slots, $t'$, to hold said bodies in position the entire width of the bodies in each section being equal to the width of the section less the thickness of one key; downwardly-depending guide portions, B', on said keys, B, to pass between said triangular bodies, $g'$, curved graduating-bars, R, for each section of keys respectively on shafts, C'; suitable pawls therein to engage ratchet-wheels, P, to actuate the same and register the amounts indicated on the key depressed; suitable connection from said wheels, P, to the numbered register-wheels, a transverse pin or rod, $i$; a bar, M, pivoted by arms to the rod, $i$, extending across each section of keys, B, bearing arms with a stop, M'', to be actuated by the motion of the keys to engage the register-wheels, P, at the end of the stroke of the key, all coacting together substantially as described for the purpose specified.

3. In a cash-register, the combination of the base, A, the drawer, O''', therein; ball-bearings for said drawer; the main frame, A', above the base, A; keys, B, in groups or sections pivoted on the shaft, C, in the frame, A'; a bar, N, extending under all of said keys to be actuated by any key when it is operated; a suitable catch for retaining said drawer connected with said bar, N, so that the drawer will be released on actuating any key; levers pivoted in the main frame, A, above; a common bar, I, extending across said keys and connected to said levers to throw said drawer open on the ball-bearings whenever a key is actuated; indicator-tablets, D', supported on rods, D, resting above each of said keys, B; a transverse plate, F, with holes mortised therethrough for each of the tablet-rods, D; links, $k$, to suspend said plate, F; and lugs, $m$, on each of said tablet-rods, D, for swinging said plate, F, to one side so that raising one tablet will release the others that may be suspended and will be itself retained by the plate, F; curved graduating-bar, R, for each group of keys revolving on a shaft; a suitable pawl on said bars; ratchet-wheels, P, adapted to be actuated by said pawl in proportion to the amounts indicated on the keys depressed; a transverse pin or rod, $i$, through the said case; a bar, M, resting on each section of keys pivoted by arms to the rod, $i$; an arm extending down from said bar, M, bearing a stop, M'', to be actuated by the motion of keys to engage the wheel, P, at the end of the stroke of the key to prevent overregistration, all coacting together for the purpose specified.

4. In a cash-register, the combination of the base, A, the drawer, O''', therein; ball-bearings for said drawer; the main frame, A', above the base, A; keys, B, in groups or sections pivoted on the shaft, C, in the frame, A'; a bar, N, extending under all of said keys to be actuated by any key when it is operated; a suitable catch for retaining said drawer connected with said bar, N, so that the drawer will be released on actuating any key; levers pivoted in the main frame, A, above; a common bar, I, extending across said keys and connected to said levers to throw said drawer open on the ball-bearings whenever a key is actuated; indicator-tablets, D', supported on rods, D, resting above each of said keys, B; a transverse plate, F, with holes mortised therethrough for each of the tablet-rods, D; links, $k$, to suspend said plate, F; and lugs, $m$, on each of said tablet-rods, D, for swinging said plate, F, to one side so that raising one tablet will release the others that may be suspended and will be itself retained by the plate, F; a curved graduating-bar, R, for each group of keys revolving on a shaft; a suitable pawl on said bars;

ratchet-wheels, P, adapted to be actuated by said pawl in proportion to the amounts on the keys depressed, for the purpose specified.

5. In a cash-register, the combination of the base, A; the drawer, O''', therein; ball-bearings for said drawer; the main frame, A', above the base, A; keys, B, in groups or sections pivoted on the shaft, C, in the frame, A'; a bar, N, extending under all of said keys to be actuated by any key when it is operated; a suitable catch for retaining said drawer connected with said bar, N, so that the drawer will be released on actuating any key; levers pivoted in the main frame, A', above; a common bar, I, extending across said keys and connected to said levers to throw said drawer open on the ball-bearings whenever a key is actuated; indicator-tablets, D', supported on rods, D, resting above each of said keys, B, a tranverse plate, F, with holes mortised therethrough for each of the tablet-rods, D; links, k, to suspend said plate, F; and lugs, m, on each of said tablet-rods, D, for swinging said plate, F, to one side so that raising one tablet will release the others that may be suspended and will be itself retained by the plate, F, for the purpose specified.

6. In a cash-register, the combination of the base, A; the drawer, O''', therein; ball-bearings contained in the grooved strips, j, and j', attached to said drawer and base respectively; the main frame, A', above; keys, B, in groups or sections pivoted on the shaft, C; the bar, N, extending under all of said keys and pivoted by the arms, N', to the shaft, C; upwardly-extending bar, O; a lever, O', pivoted to said upwardly-extending bar, O, at its forward end; a lug on the under part of the top of the base, A, and in its normal position the rear end engaging in said drawer, O'''; the rock-shaft, G, bearing bell-cranks, or levers, with the arms, G', G'', the longer arm, G', projecting from said rock-shaft and engaging the drawer, O''', at the back side; a bar, I, extending across said main frame, A'; links, I'', I'', connecting the ends of the shorter arm, G'', of the bell-cranks to coact with the keys on said drawer, the starting of the keys first releasing the drawer by depressing the front end of the lever, O', for the purpose specified.

7. In a cash-register, the combination of the base, A; the drawer, O''', therein; ball-bearings contained in the grooved strips, j and j', attached to said drawer and base respectively; the main frame, A', above; keys, B, in groups or sections pivoted on the shaft, C, in the frame, A'; suitable connection from said keys to a release mechanism for releasing said drawer, O''', the rock-shaft, G, bearing the bell-crank with arms, G', G'', the longer arm, G', of said bell-crank projecting down from said rock-shaft and engaging the drawer, O''', at the back, said bar, I, extending across said main frame, A'; links, I'', connecting the ends of said short arms, G'', of the bell-cranks to coact with the keys operating the said drawer, the starting of the keys operating the releasing mechanism to release the drawer before acting upon the bar, I, for the purpose specified.

8. In a cash-register, the combination of the main frame, A'; keys, B, pivoted on the shaft, C, across said main frame; indicator-tablets, D', supported on rods, D, to rest on the rear ends of said keys, B; a transverse plate, F, with holes mortised therethrough for each of the tablet-rods, D'; links, k, to suspend said plate, F and connect the same to the frame above to allow the plate to spring lengthwise always in the horizontal position; lugs, m, on said tablet-rods, D, for swinging the said plate, F, to one side so that raising one tablet will release the others that may be suspended by swinging the plate, F, to one side and be itself retained by said plate, F, swinging against it, for the purpose specified.

9. In a cash-register, the combination of indicator-tablets supported on tablet-rods, D; a plate, F', transverse to said tablet-rod, D, and supported by upwardly-extending arms, a, therefrom pivoted to the case; springs, n, n, adapted to press against the tablet-rods, D, and support them in place by friction; downwardly-extending arms, a', a', passing down to the rear of the drawer of the register; a rod, h, connected to said downwardly-extending arms, a', a', with a catch to engage in the upper outer casing to hold back the arms, a'; a spring, b, connected to said arms, a', and to the forward part of the case to tend to draw said arms, a', forward so that when the rod, h, is released and the drawer is opened the spring will draw the plate, F', toward the tablet-rods and press the springs, n, against them to support the tablet-rods by friction, for the purpose specified.

10. In a cash-register, the combination of indicator-tablets supported on tablet-rods, D; a plate, F', transverse to said tablet-rods; springs, n, n, on said plate, F', adapted to rest against the tablet-rods, D, and suitable connections between said plate and drawer so that opening the drawer will allow the plate to move the springs into contact with the tablet-rods to support the same and a stop, as rod, H, connected to said mechanism to throw it into or out of operation, in connection with the usual means for operating indicator-tablets to serve as an auxiliary to the same to permit the actuation of several keys successively for the purpose specified.

11. In a cash-register, the combination of the keys, B, pivoted to act as levers; racks, S, S, to the rear of said machine between which the keys, B, are guided; reversible pawls, f, pivoted at f', to the rear of each of said keys; and stops f'', to prevent said pawls from swinging out of engagement with the racks, S, for the purpose specified.

12. In a cash-register, the combination of the keys, B, pivoted to act as levers; triangular-shaped bodies, $g$, to the rear end of said keys and supported between them, said bodies containing slots, $t'$, at their upper or broad end, and the narrow end, $r$, resting in little depressions in a suitable support; screws, $t$, in the upper transverse slots, $t'$, to hold said bodies in position the entire width of the bodies with each group of keys being equal to the width of the group less the thickness of one key so that but a single key can be operated at a time, for the purpose specified.

13. In a cash-register, the combination of the keys, B, pivoted to act as levers; triangular-shaped bodies, $g$, to the rear end of said keys and supported between them, said bodies containing slots, $t'$, at their upper or broad end, and a narrow end, $r$, resting in little depressions in a suitable support; screws, $t$, in the upper transverse slots, $t'$, to hold said bodies in position the entire width of the bodies with each group of keys being equal to the width of the group less the thickness of one key so that but a single key can be operated at a time; downwardly-depending guide portions, $B'$, on said keys, B, to pass between said triangular bodies, $g$, for the purpose specified.

14. In a cash-register, the combination of the keys, B, pivoted to act as levers; racks, S, S, to the rear of said machine between which the keys, B, are guided; reversible pawls, $f$, pivoted at $f'$, at the rear of said keys; and stops, $f''$, to prevent said pawls from swinging out of engagement with the racks, S; triangular bodies, $g$, to the rear of said keys and in front of said racks and supported between said keys, said bodies containing slots, $t'$, at their upper or broad end, the narrow end, $r$, resting in little depressions on suitable supports to the front of the racks, S; screws, $t$, in the upper transverse slots, $t'$, to hold said bodies in position the entire width of the bodies of each group being equal to the space less the thickness of one key; downwardly-extending guide portions $B'$, on said keys, B, to pass between said triangular bodies, $g$, all coacting together for the purpose specified.

15. In a cash-register, the combination with the register mechanism, of a bar, $L'$; angular knives, $s, s$, on said bar; a curved bar, W, with a cam thereon to engage the outer end of said transverse bar, $L'$; a cover to said case connected to said bar, W, to actuate the same when the cover is raised to move the knives, $s$, into mesh with the register-wheels to lock the register mechanism, for the purpose specified.

16. In a cash-register, the combination with the register mechanism, of a tight casing, X, soldered over the register mechanism with suitable apertures through which the numbers appear; a transverse bar, $L'$, beneath said casing, X; knives, $s, s$, on said bar, $L'$; a curved bar, W, connected with the cover of said outer casing and projecting through the casing, X, with a cam thereon to engage the transverse bar, $L'$, so that raising the cover of the case will actuate the bar, $L'$, and move the knives into mesh with the register-wheels to lock the same whenever the case is open to prevent tampering with the registering mechanism, as specified.

17. In a cash-register, keys in sections pivoted to act as levers; a transverse pin or rod, $i$, through the case of said register; a bar, M, pivoted by arms to the rod, $i$, and extending across each section of keys; an arm with a stop, $M''$, borne on said bar, M, to be actuated by the motion of the keys to engage the gear-wheel of the register mechanism on the completion of the stroke of the key to prevent overregistration, for the purpose specified.

18. In a cash-register, the combination of the register-wheels, U, $U'$, $U^2$, $U^3$; antifriction-rollers, $x, x, x$, on the face of said wheels; pawls, $c'$, and ratchet-wheels, $v$, attached to the backs of each of said wheels on which said pawls, $c'$, act; and levers, $c$, pivoted to said pawls, $c'$, to engage the antifriction-roller, $x$, on the face of the wheel adjacent to said ratchet-wheel $v$; a spring, $c'$, for returning said lever to the normal position after it has been actuated by the antifriction-roller, $x$, and the adjusting-screw, $l$, to adjust the action of the lever, $c$, to adjust the movement of the pawls, $c'$, for the purpose specified.

19. In a cash-register, the combination of the register-wheels, U, $U'$, $U^2$, $U^3$; antifriction-rollers, $x, x, x$, on the face of said wheels; pawls, $c'$, and ratchet-wheels, $v$, at the backs of each of said wheels on which each of said pawls, $c'$, act; and levers, $c$, pivoted to said pawls, $c'$, to engage the antifriction-rollers, $x$, on the face of the wheel adjacent to said ratchet-wheel, $v$; a spring, $c'$, for returning said lever to the normal position after it has been actuated by the antifriction-roller, $x$; an adjusting-screw, $l$, to adjust the action of the lever, $c$, to adjust the movement of the pawl, $c'$, and a detent-pawl, $y$, to act on said ratchets, $v$; a spring, $y'$, to hold said detent-pawl, $y$, in contact with the ratchet-wheel, $v$, as specified.

20. In a cash-register, the combination of the register-wheels, U, $U'$, $U^2$, $U^3$; antifriction-rollers, $x, x, x$, on the face of said wheels; pawls, $c'$; and ratchet-wheels, $v$, attached to the backs of each of said wheels on which each of said pawls $c'$, act; and levers, $c$, pivoted to said pawls, $c'$, to engage the antifriction-rollers, $x$, on the face of the wheels adjacent to said ratchet-wheel, $v$; a spring, $c'$, for returning said lever to the normal position after it has been actuated by the antifriction-roller, $x$; an adjusting-screw, $l$, to adjust the action of the lever, $c$, to adjust the movement of the pawl, $c'$, and detent-pawl, $y$, as specified.

21. In a cash-register, the combination of pivoted keys, pivoted toward the front of the case of said machine; corresponding indicator-slides bearing suitable tablets at the top above the rear ends of said keys, a transverse shaft across said machine above said keys, gear-wheel on said shaft, curved graduated bar above said keys and pivoted by suitable arms to the said transverse shaft and returning to its normal position by the force of gravity, a suitable pawl on said graduated bar to engage said gear to actuate the register mechanism so that when a key is operated it shall actuate the machine and all parts return to the normal position by the force of gravity as specified.

In witness whereof I have hereunto set my hand and seal in the presence of two witnesses.

LUKE COONEY, JR. [L. S.]

Witnesses:
MARIAN I. LONGYEAR,
WALTER S. WOOD.